Nov. 5, 1968

L. BRONICKI 3,409,782

POWER GENERATING UNITS

Filed Oct. 8, 1965

Inventor
Lucien Bronicki

By
Kirschstein, Kirschstein & Ottinger
Attorneys

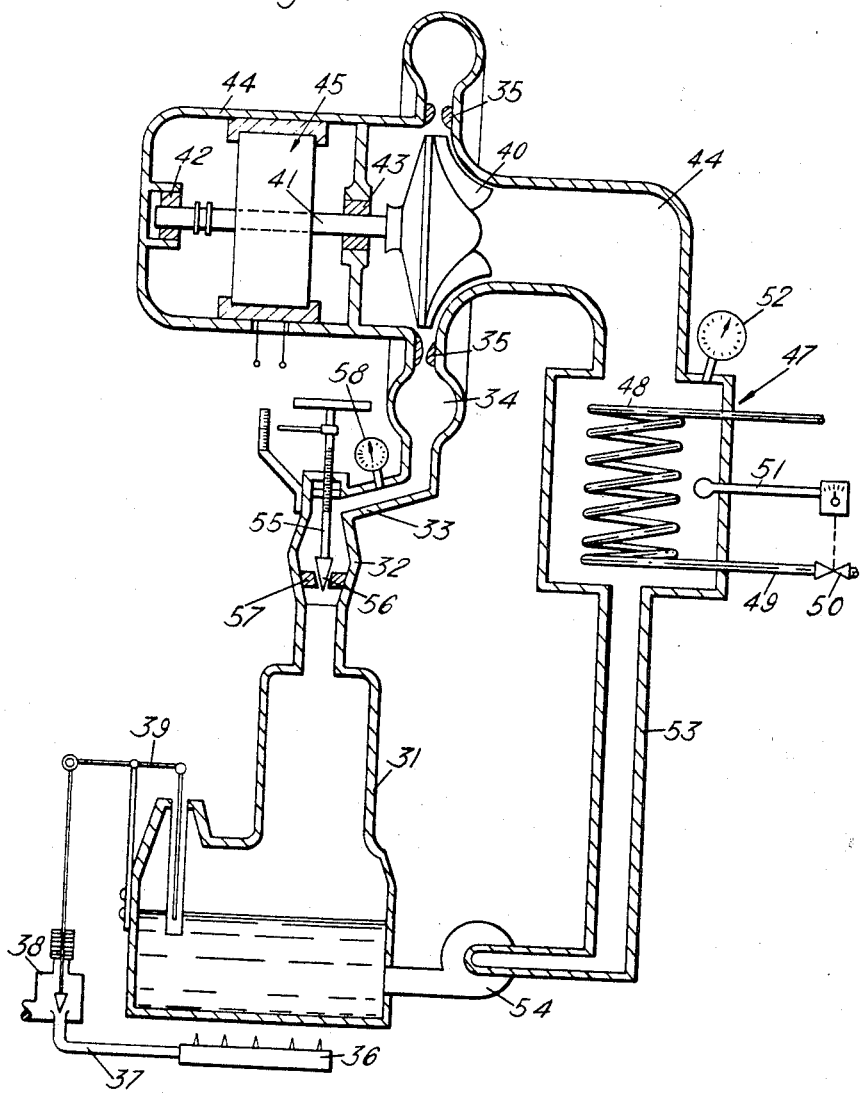

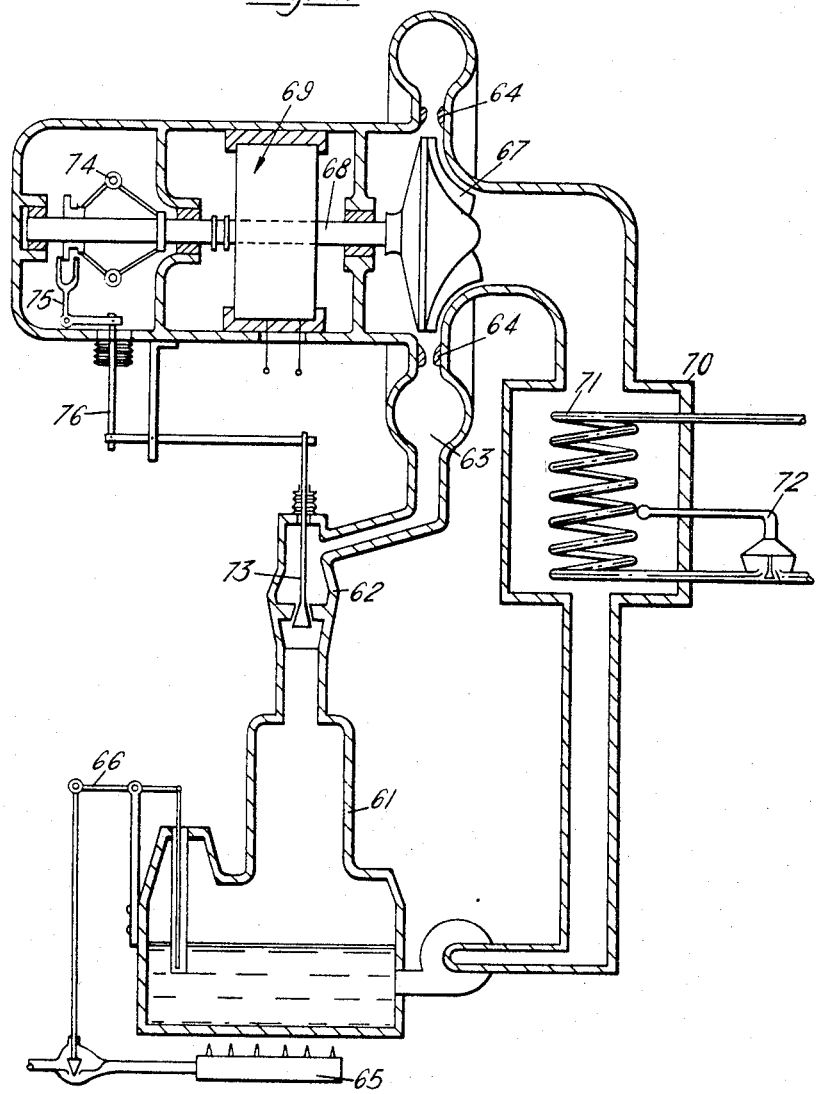

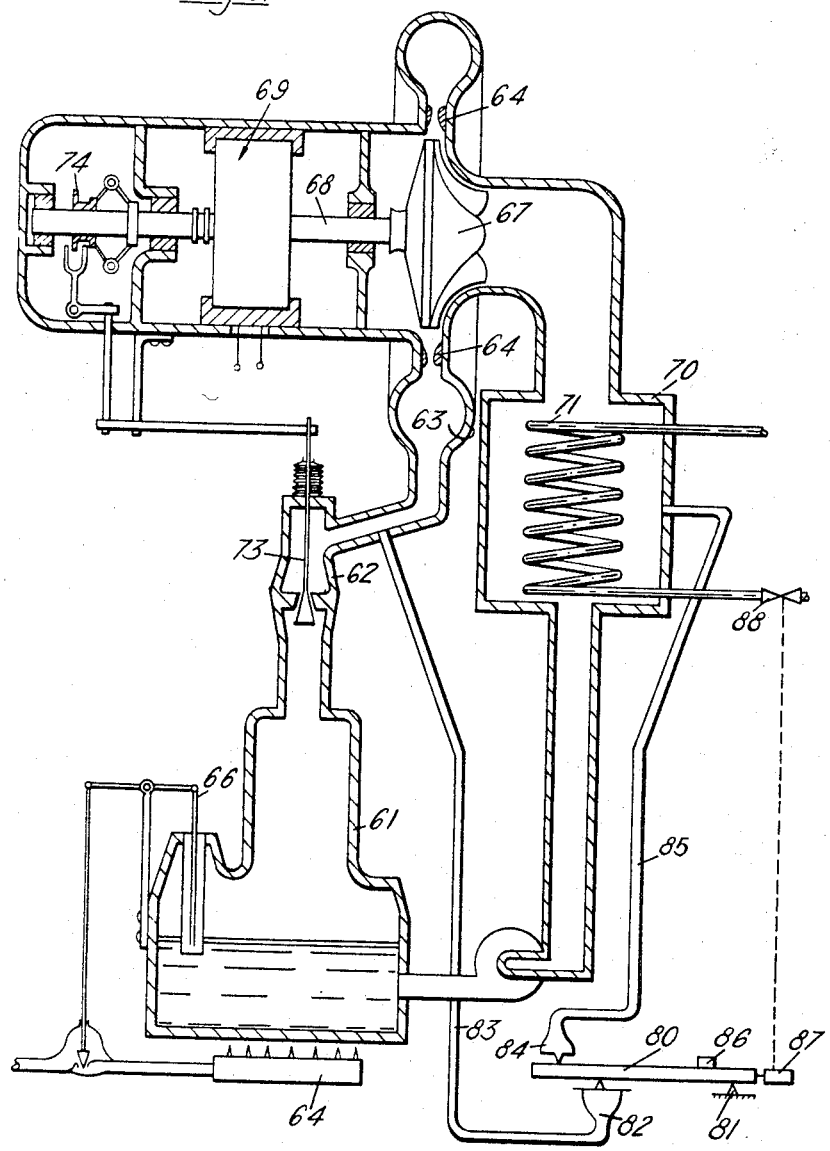

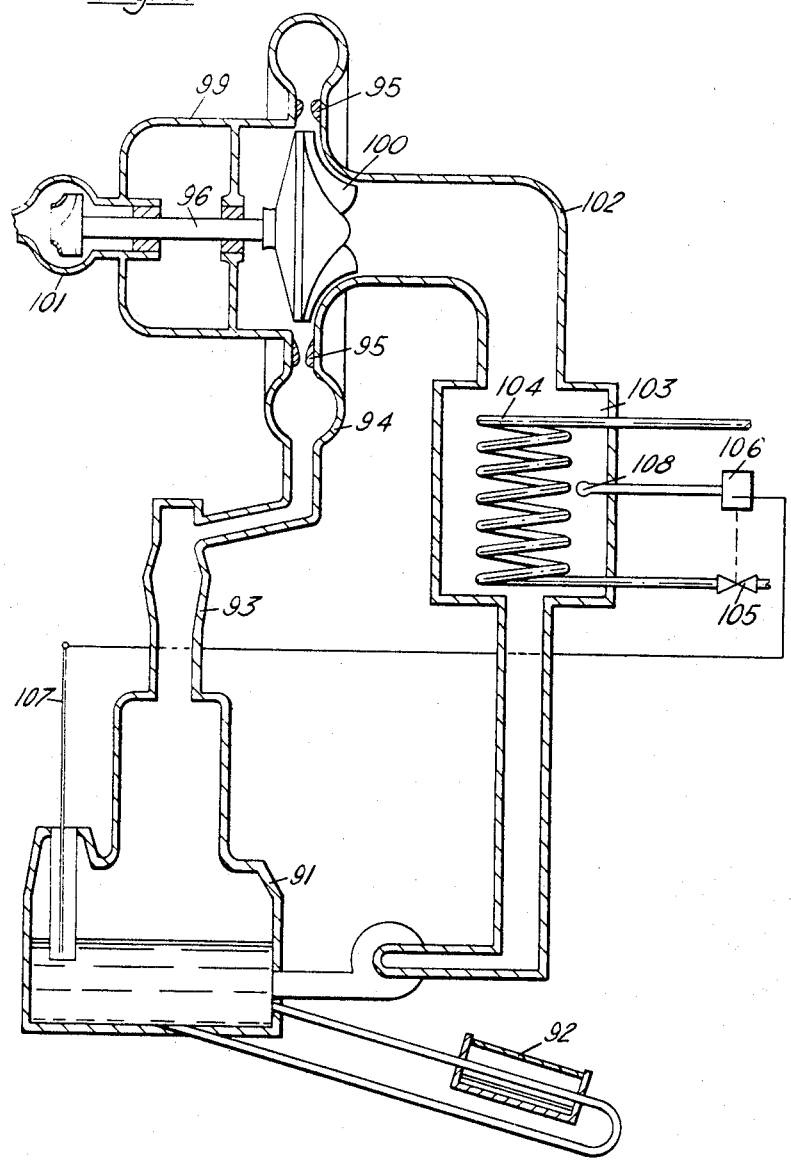

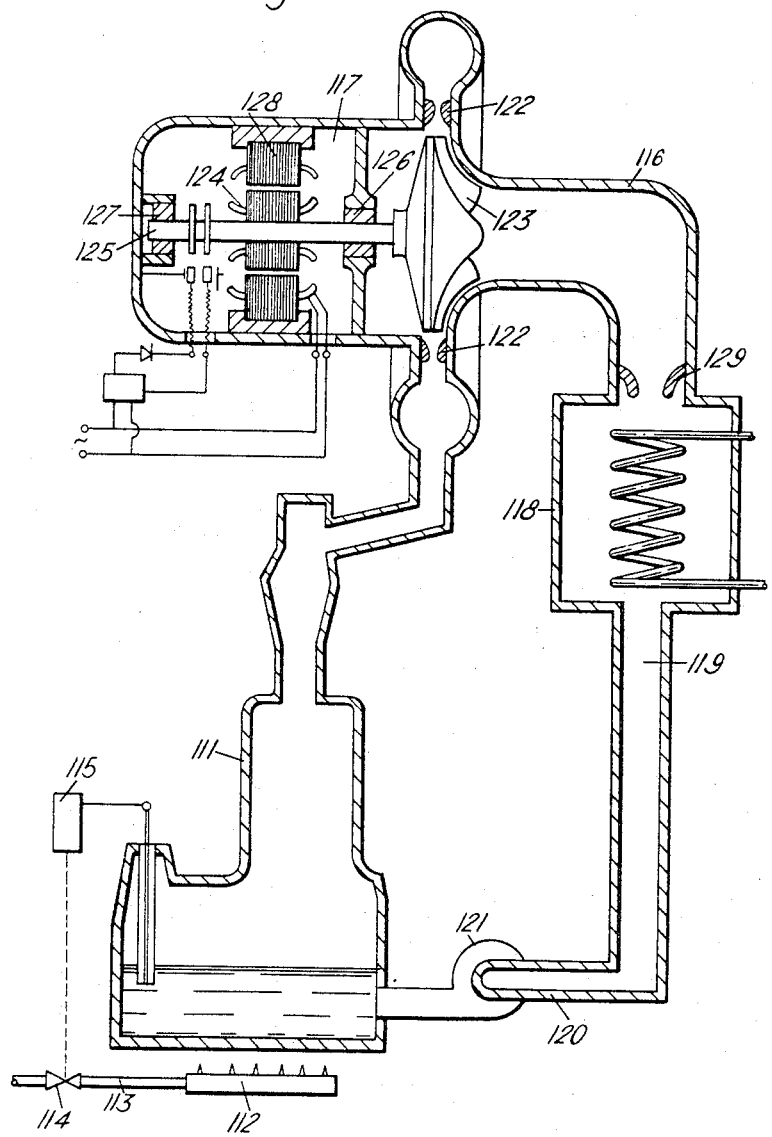

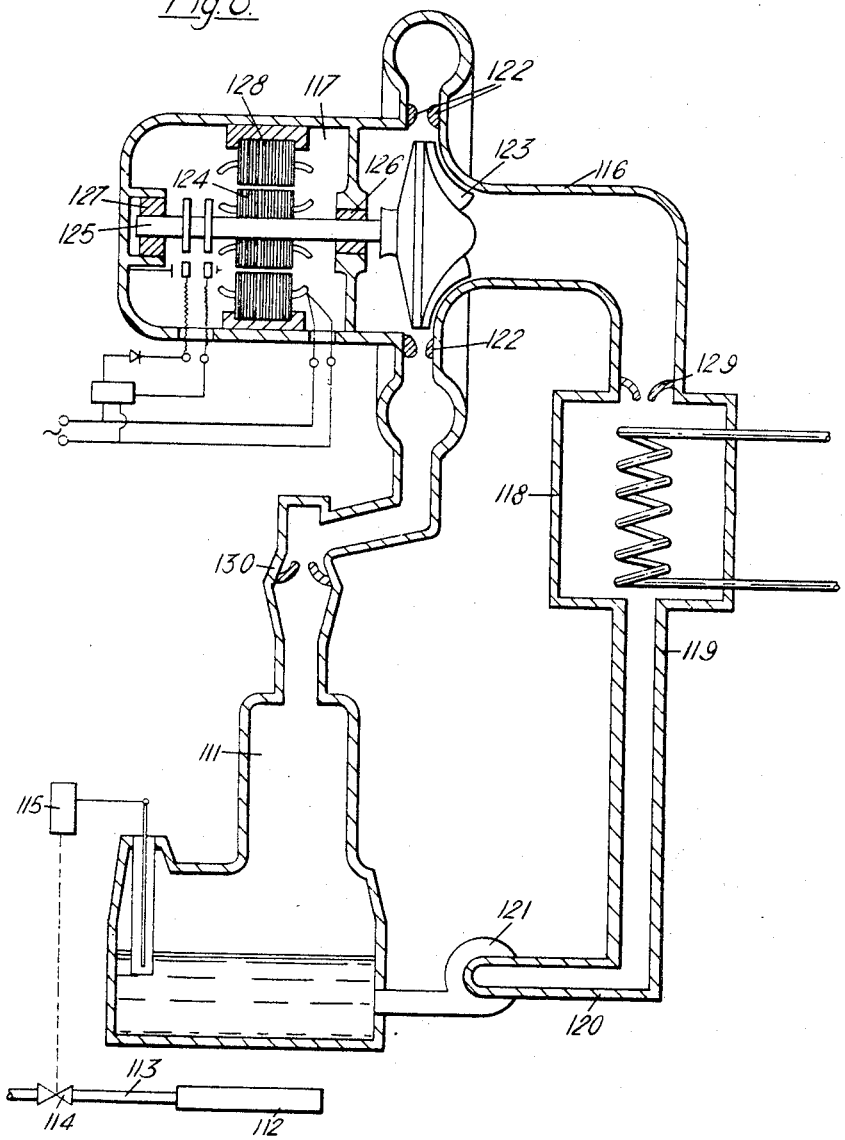

United States Patent Office 3,409,782
Patented Nov. 5, 1968

3,409,782
POWER GENERATING UNITS
Lucien Bronicki, Rehovoth, Israel, assignor to State of
Israel, Prime Minister's Office, Jerusalem, Israel
Filed Oct. 8, 1965, Ser. No. 494,062
Claims priority, application Israel, Dec. 25, 1964,
22,670; Apr. 20, 1965, 23,395
18 Claims. (Cl. 290—2)

ABSTRACT OF THE DISCLOSURE

A power generating unit which operates on a closed Rankine cycle. The unit is adapted to drive a load. The unit includes the usual motive fluid, a boiler for evaporating the fluid to a vapor, a turbine having a turbine shaft and at least one primary nozzle to which the boiler vapor is fed and a condenser for condensing the exhaust vapor to a liquid which is recycled to the boiler. The improved feature of the unit resides in the inclusion of an arrangement at the exhaust side of the turbine for adjusting the density of the turbine exhaust vapor in accordance with the inlet density such that the exhaust vapor density is co-directional in change with the change in the inlet density. Thus, when the inlet density increases, the exhaust density increases, when the inlet density decreases, the exhaust density likewise decreases and when the inlet density remains constant, the exhaust density, too, remains constant. Thereby a substantial drop of the nozzle efficiency is prevented.

---

The present invention concerns power generating units operating on a closed Rankine cycle, comprising a boiler for the evaporation of the motive fluid, a turbine fed with vapour from the boiler and driving a generator or any other load, a condenser condensing the exhaust vapours from the turbine and means for recycling the condensed fluid to the boiler. Such units will be referred to hereinafter as "power generating units of the kind specified."

In power generating units of the kind specified it is often necessary to vary the power output below or above the rated value. While raising the power output above the rated value has so far not been practised it is known to reduce the power output below the rated value by several methods. In accordance with one known method such a reduction is achieved by a so-called partial admission, i.e. by the occasional reduction of the number of operative nozzles in accordance with the output requirements. However, this method is difficult to carry out, in particular in small power generating units, and it involves the application of rather complicated and fine-mechanical mechanisms likely to reduce the reliability of the unit and also the wheel efficiency, as compared to full admission efficiency.

By another known method for the reduction of the output below the rated output, the vapour supplied to the nozzles is throttled. However this method again may seriously impair the efficiency of the unit, especially in cases of small units of the kind specified having a single-stage turbine. In such small turbines the Mach number of the vapour flow in the nozzles is usually high, e.g. of the order of 2 or 3, and experiments have shown that in such cases the nozzle efficiency is very sensitive to small departures of the operational pressure from the design pressure.

It is thus seen that whereas the partial admission method is unsatisfactory, i.e. from the point of view of the reliability and wheel efficiency, the throttling method is unsatisfactory from the point of view of the nozzle efficiency with the result that either procedure is unsatisfactory from the point of view of the overall-stage efficiency, particularly when applied to small turbines.

It is one object of the present invention to provide a power generating unit of the kind specified wherein the power output is controlled by a control of the density of the vapour fed from the boiler to the turbine.

It is another object of the present invention to provide a power generating unit of the kind specified capable of operating smoothly and continuously and without substantial change in efficiency under conditions of uneven heat supply to the boiler, e.g. where the boiler is heated by solar energy.

Another problem encountered in power generating units of the kind specified is the following:

Although the sink temperature, i.e. the temperature at which heat is rejected in the condenser, should be constant, some fluctuations of the temperature and consequential fluctuations of the condenser pressure occur. Thus, for example, where a power generating unit of the kind specified operates continuously over a long period the seasonal and daily changes in the cooling water temperature or in the ambient temperature will result in variations of the pressure in the condenser. But even over shorter periods there may be some unpredictable sudden rises or drops of the sink temperature with ensuing corresponding changes in the condenser pressure. Such fluctuations of the condenser pressure will frequently cause shock waves in the turbine nozzles with the result that the nozzle efficiency is reduced.

It is, therefore, yet another object of the present invention to provide a power generating unit of the kind specified with means to avoid any substantial drop of the nozzle efficiency as a result of fluctuations of the sink temperature.

Quite generally the power output of a vapour turbine depends on the impulse of the vapour on the turbine blades. This impulse increases with the increase of the rate of vapour flow or, for a given volume rate of flow, with the density of the flow. Where the turbine nozzles operate under sonic or supersonic conditions, the volume rate of flow is substantially constant even if the density of the vapour fed to the turbine is changed so that consequently the power output is related directly to the inlet density of the vapour.

However, a change of the vapour pressure from the rated value produces, in general, shock waves in the turbine nozzles whereby the nozzle efficiency is considerably reduced. In accordance with the present invention it has been found that such a reduction of the nozzle efficiency can be avoided to a very considerable exent if the vapour pressure on the exhaust side of the turbine is changed simultaneously by an amount characteristic for the nozzles.

In accordance with the invention there is provided a power generating unit of the kind specified, comprising means for varying the inlet density of the vapour fed from the boiler to the turbine and means on the exhaust side of the turbine for regulating the density of the turbine exhaust vapour in accordance with the variation of the inlet density thereby to prevent a substantial drop of the nozzle efficiency.

The inlet density of the vapour fed from the turbine to the nozzle may be regulated either by changing the saturation temperature of the boiler or, at constant temperature by throttling. Variation of the inlet density by the change of the saturation temperature is achieved simply by variation of the boiler temperature. In this case it is possible both to lower the output below the rated value or to raise it above this value. Where throttling is resorted to, this may, for example, be achieved by incorporating a master throttle in the passage leading from the boiler to the nozzle manifold. Throttling enables as a rule only the lowering of the output below the rated value.

The variation of the inlet vapour density and therefore of the output of a power generating unit according to the invention may in one aspect of the invention have the purpose of adapting the power output to load requirements. In this case the variation of the vapour density will be a secondary or dependent variable. In such a case the control of the inlet vapour density may be governed by means responding to the load requirement.

In another aspect of the invention the boiler temperature is the primary variable. This materialises for example where the boiler is heated by solar energy and consequently the heat supply to the boiler varies with the daily and seasonal variations of the position of the sun.

The means for regulating the density of the turbine exhaust vapour in accordance with the variations of the inlet vapour density provided in accordance with the present invention, may be of various designs. In accordance with one embodiment of the invention said means consist of at least one auxiliary nozzle fitted between the turbine wheel and the condenser and designed for the passage of the entire exhaust vapour on its way from the turbine to the condenser at a throat velocity of at least 0.8 Mach at any boiler pressure at which the unit is normally operating.

Since the above auxiliary nozzle functions as a regulator and operates at or near sonic throat velocity it will be referred to hereinafter as "regulating sonic nozzle."

It has been found both experimentally and from theoretical considerations that the provision of the above regulating sonic nozzle between the turbine and the condenser has the effect of adjusting automatically the pressure of the exhaust vapour emerging from the turbine to the variations of the vapour pressure on the inlet side of the turbine in such a manner that the vapour flow through the turbine nozzles proceeds in a smooth, continuous and substantially shock-free manner irrespective of variations of the inlet density. This automatic regulation is based on the fact that vapour density variations on the inlet side, i.e. before the nozzles of the turbine, are communicated through the turbine to the regulating sonic nozzle creating a change in pressure on the inlet side of the latter which being sonic has a constant (volumetric) flow capacity independent of the pressure variations.

The same regulating sonic nozzle also achieves a further object of the invention namely to shield the turbine nozzles from shocks resulting from fluctuations in the sink temperature. It is well known that where, in cases of a nearly sonic or supersonic fluid flow through a nozzle there occurs a pressure variation on the low pressure side, such a variation produces shock waves at the outlet from the nozzle and thereby a drastic drop in the nozzle efficiency. By the provision of the regulating sonic nozzle in accordance with the invention, the shock boundary is removed from the ordinary turbine nozzles to the discharge end of the regulating sonic nozzle so that any shocks resulting from fluctuations in the sink temperature (condensing pressure) will occur in or near the latter.

The regulating sonic nozzle thus also has a shielding effect which in itself is a considerable contribution towards the retention of the nozzle and wheel efficiencies at varying sink temperatures. This aspect of the invention becomes apparent from the following Tables I and II. As shown in Table I the power output of a unit designed for 10 HP at 30° C. ambient temperature varies much less with the change of the ambient temperature, if at all, in case of a unit comprising a regulating sonic nozzle in accordance with the invention, than in case of the same unit without such nozzle. Likewise it follows from Table II that the fuel consumption rises much less, if at all, upon variation of the ambient temperature, in case of a unit with a regulating sonic nozzle in accordance with the invention, than in case of the same unit without such nozzle.

TABLE I

POWER UNIT AT VARIABLE AMBIENT TEMPERATURES BUT AT CONSTANT BOILER TEMPERATURE OF A SUPERSONIC VAPOUR TURBINE DESIGNED FOR 10 HP AT 30° C. AMBIENT

| Ambient temperature, °C. | Power output without sonic regulating nozzle, HP | Power output with sonic regulating nozzle between turbine and condenser, HP |
|---|---|---|
| 15 | 6.6 | 10.0 |
| 20 | 7.9 | 10.0 |
| 25 | 9.7 | 10.0 |
| 30 | 10.0 | 9.7 |
| 35 | 9.4 | 8.9 |
| 40 | 7.6 | 8.1 |
| 45 | 6.2 | 7.5 |

TABLE II

FUEL CONSUMPTION AT VARIABLE AMBIENT TEMPERATURES FOR DELIVERING 10 HP BY A SUPERSONIC VAPOUR TURBINE DESIGNED FOR 10 HP OUTPUT WITH FUEL CONSUMPTION OF 7 KG. PER HOUR AT 30° C. AMBIENT

| Ambient temperature,° C. | Fuel consumption, kg./hr. | |
|---|---|---|
| | Without sonic regulating nozzle | With regulating sonic nozzle |
| 15 | 11.8 | 7.0 |
| 20 | 9.3 | 7.0 |
| 25 | 7.3 | 7.0 |
| 30 | 7.0 | 7.1 |
| 35 | 7.7 | 8.1 |
| 40 | 9.7 | 9.0 |
| 45 | 12.0 | 9.7 |

The variation of the inlet vapour density may also become necessary under constant load conditions. Thus, for units designed to supply a constant load and where the ability to supply this load under all ambient conditions is mandatory, the boiler temperature is set at one of two levels according to the condenser temperature. Under normal operating conditions, with the condenser temperature equal to or below the design temperature, the boiler temperature is fixed at its design level. The unit then produces the rated power output. However, if on some occasions the ambient or cooling water temperature rises above the design value, the unit cannot provide the rated power because of the shock losses induced since the unit is working outside the range of the regulating sonic nozzle. If, however, under such conditions the boiler temperature is raised, more vapour will flow through the turbine so that, even at the reduced efficiency, the rated output can be delivered. It is true that the efficiency may be poor under these conditions, but in general, these exceptional conditions will only occur for a small fraction of the year. In practice a thermostat in the condenser is arranged to override or bypass the design thermostat on the boiler, thereby permitting the boiler temperature to rise to a high value, set by a second thermostat. In such an embodiment of the invention the inlet temperature is again a secondary or dependent variable.

In accordance with another embodiment of the present invention said means for regulating the density of the turbine exhaust vapours are designed for a variation of the sink temperature of the condenser.

In accordance with yet another embodiment there is provided at least one damper in the passage leading from the exhaust of the turbine wheel to the condenser. The more such a damper is opened the less the pressure drop between turbine outlet and condenser, and the more it is closed the greater this pressure drop. In this way it is possible to compensate for variations in condenser pressure due to variations in the condenser temperature. This damper, if governed by the boiler temperature, has a similar effect on the above mentioned regulating sonic nozzle.

In any event of an output different from the rated value the nozzles and wheel will in accordance with the present invention retain a major portion of their design efficiency.

The advantages of the present invention can be seen from the following example. It was found that a convergent-divergent nozzle designed for an inlet pressure (absolute) of 91.6 mm. Hg and an outlet pressure of 4.5 mm. Hg retains a high proportion of its design efficiency when the inlet pressure is reduced to 51 mm. Hg and at the same time the output pressure is reduced to 1.9 mm. Hg. If the inlet pressure is further reduced to 33.6 mm. Hg and the outlet pressure to 2.1 mm. Hg, the efficiency is still not far below the design value.

The following Table III gives the performance characteristic for such a nozzle in a power generating unit of the kind specified operating on o-dichlorobenzene vapour.

TABLE III

| | | | |
|---|---|---|---|
| Boiler temperature, °C | 110 | 95 | 85 |
| Corresponding boiler pressure, mm. Hg | 91.6 | 51 | 33.6 |
| Corresponding density, gr./liter | 0.55 | 0.32 | 0.215 |
| Condenser temperature, °C. (for maximum efficiency) | 45 | 37.5 | 32.5 |
| Corresponding condenser pressure, mm. Hg | 4.5 | 2.9 | 2.1 |
| Corresponding condenser density, gr./liter | 0.032 | 0.021 | 0.015 |
| Flow through nozzles, gm./sec | 37.4 | 21.6 | 13.0 |
| Power output (kw.) | 1.0 | 0.57 | 0.27 |
| Turbine efficiency, percent | 10 | 8.7 | 7.9 |

It is seen from the above table that a turbine designed for 1 kw. output and having a Carnot efficiency of 10% can be used with no changes in the turbine and in the amount of fluid in the system for an output of 0.57 kw. by simply changing the boiler temperature from 110° C. to 95° C. and at the same time changing the condenser temperature from 45° C. to 37.5° C., with the overall Carnot efficiency only dropping slightly from 10% to 8.7%. In a similar manner the same unit may also be used for an output of only 0.27 kw. at an overall efficiency of 7.9% by reducing the boiler temperature to 85° C. and, simultaneously, the condenser temperature to 32.5° C. In other words, a unit designed for a power output of 1 kw. can be used without any changes whatsoever in design or amount of operative fluid for a power output of 0.57 kw. at an efficiency of 87% of the efficiency under design conditions for the rated output, or for an output of only 0.27 kw. at an efficiency of 71% of the efficiency for the rated output. It is obvious that in a similar manner the unit can be used for any other output by a suitable reduction of inlet and outlet densities.

The efficiencies shown in the above table refer to results obtained when the inlet density is reduced by a reduction of the boiler temperature and the exhaust density is controlled by the sink temperature. Similar results are obtained when the exhaust density is regulated by a regulating sonic nozzle and/or if the inlet density is reduced by throttling the vapour flow to the nozzles.

It follows clearly from the above Table III that the reduction in power output is not due to the slight reduction of the Carnot efficiency which latter is only secondary.

Where in a power generating unit according to the invention the power output is controlled by the control of the boiler temperature the resulting variations of the boiler pressure cause flow changes inside the unit. These changes are affected by conditions in the unit, for example the condensing temperature. This means that such conditions are "reflected" into the boiler and the output of the turbine is not a univalent function of the boiler temperature. This effect is in particular pronounced where the turbine nozzles are subsonic since in this case flow variations on the exhaust side of the turbine reflect into the boiler.

Therefore in some embodiments of power generating units according to the invention there is provided at least one regulating sonic nozzle in the path of the vapour from the boiler to the turbine nozzles designed for the passage of all the vapour from the boiler at a throat velocity of at least 0.8 Mach at any boiler pressure at which the unit is normally operating.

Because of the provision of this regulating sonic nozzle all the space of the intake side of this nozzle, including the boiler, is shielded from any change of conditions in the unit, i.e. from the outlet side of the regulating sonic nozzle. Because of this, the mass flow from the boiler depends only on the boiler temperature and the power output of the unit is the rated output for the given temperature. Against this as already pointed out above if the regulating sonic nozzle were not present the flow rate from the boiler and with it the power output of the unit would deviate from the rated value for the given temperature.

As in accordance with one embodiment of the invention there may also be provided a regulating sonic nozzle between the turbine exhaust and the condenser, the latter will be referred to hereinafter as "first regulating nozzle" whereas the one that may be provided between the boiler and the turbine will be referred to as "second regulating sonic nozzle."

The second regulating sonic nozzle may be combined with any of the various means provided in accordance with the invention for regulating the density of the exhaust vapours. Thus the second regulating sonic nozzle may be combined with means for the control of the condenser temperature, with a baffle in the exhaust duct of the turbine or with a first regulating sonic nozzle.

The provision of the means in accordance with the invention for regulating the density of the turbine exhaust vapour and thereby to prevent a substantial drop of the nozzle efficiency in consequence of variation of the inlet vapour density causes a certain drop in the Rankine efficiency of the unit, corresponding to a decrease of a few degrees centigrade of the temperature drop of the cycle. However, in the operation of a power generating unit of the kind specified the Rankine efficiency is only one of the considerations, the other considerations being nozzle, wheel and stage efficiencies, the simplicity of design, reliability of performance, capital investment and operational costs. From all these points of view it can be shown that in many cases the drop of the Rankine efficiency of the unit caused, for example, by the installation of a first regulating sonic nozzle in accordance with the invention is a price which it is well worthwhile to pay for obtaining a simple and shock-free output control by control of the boiler temperature. Moreover, in cases where the boiler temperature is a primary variable, such as where the boiler is operated by solar energy, a shock-free, automatic, continuous and simple adjustment of the output of the unit to the available energy is a conditio sine qua non for its operation. In case of a first regulating sonic nozzle installed in a power generating unit according to the invention the slight drop of the Rankine efficiency of the unit is in addition also compensated by the complete and reliable shielding of the turbine nozzles from any adverse effect that would otherwise be caused by the fluctuations in the sink temperature as demonstrated in Tables I and II hereinbefore.

Similar considerations also apply for the second regulating sonic nozzle. Thus, when such a nozzle has to be provided in order to ensure that the power output is the one rated for the given temperature, the reliability of the power output ensured in this manner usually outweighs by far the small drop of the Rankine efficiency of the unit caused by the provision of the second regulating sonic nozzle.

In the present specification the invention is described for the sake of simplicity with reference to units comprising single stage turbines. It is, however, understood that the invention also applies to units with multistage turbines in which case said means for regulating the density of the exhaust vapours will be mounted between the last turbine wheel and the condenser, and the second regulating sonic nozzle, if any, will be mounted between the boiler and the first turbine nozzle.

The invention is illustrated, by way of example only, in the accompanying drawings in which:

FIG. 3 is a diagrammatic sectional view of a further embodiment with inlet vapour density control by throttling and exhaust density regulation by condenser temperature control;

FIG. 4 is an elaboration of the embodiment according to FIG. 3, in which the inlet density control is by throttling and is governed by an output detector;

FIG. 5 is yet another elaboration of the embodiment according to FIG. 3 in which the inlet density control is by throttling and is governed by an output detector;

FIG. 6 is a diagrammatic sectional view of a power generating unit according to the invention comprising a solar collector as source of energy;

FIG. 7 is a diagrammatic sectional view of yet another embodiment of a power generating unit according to the invention comprising a first regulating sonic nozzle; and FIG. 8 is a diagrammatic sectional view of a modification of the embodiment of FIG. 7 fitted also with a second regulating sonic nozzle.

Figure 1:
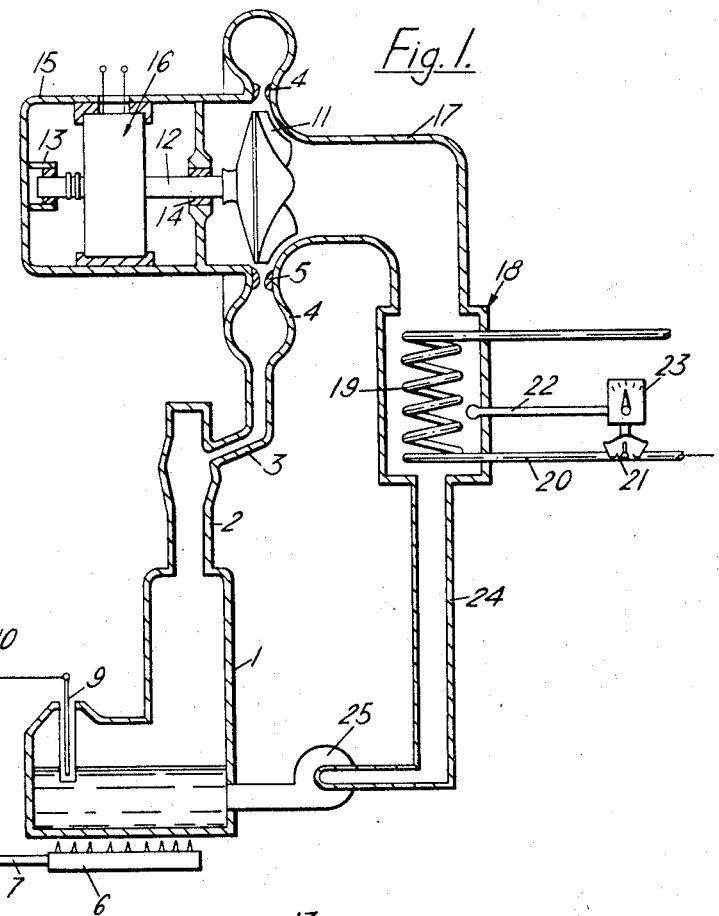
FIG. 1 is a diagrammatic sectional representation of one embodiment of a power generating unit according to the invention with control of the boiler temperature and exhaust density regulation by condenser temperature control.

The power generating unit according to the invention illustrated in FIG. 1 comprises a boiler 1 linked through an intermediary chamber 2 and a neck 3 to a manifold 4 communicating with a number of nozzles 5. Boiler 1 is heated by a burner 6 whose fuel supply line 7 is controlled by a valve 8 governed by a thermostat device 9 fitted with means 10 for setting it at the desired temperature. The unit further comprises a turbine wheel 11 keyed on a shaft 12 journalled in bearings 13 and 14 supported by a sealed casing 15. Also keyed on shaft 12 is the rotor of an electric generator 16. A duct 17 leads from the exhaust side of wheel 11 to a condenser 18 comprising a coil 19 whose inlet pipe 20 is fitted with a control valve 21 governed by a thermostat device 22 comprising means 23 for the setting of the temperature. The thermostat 22, 23 detects and responds to the condensing temperature in the condenser. Finally, the unit comprises a duct 24 and a pump 25 for returning the condensed motive fluid into boiler 1.

During operation the boiler temperature is maintained constant by means of the thermostat device 7, 8, and, likewise, the condenser temperature is kept constant by means of the thermostat device 20, 21. If it is desired to change the output of the device, the inlet density of the vapour is changed by changing the operating temperature of the boiler and the density of the exhaust vapour is regulated accordingly by a suitable adjustment of the condenser temperature and condenser. This is done by suitably changing the setting of the thermostats 9, 10 and 22, 23. The amount by which the temperatures of the boiler and the condenser has to be changed for a certain desired output other than the rated output can be determined empirically and may be indicated in characteristic tables of the kind of Table III given hereinbefore.

Figure 2:
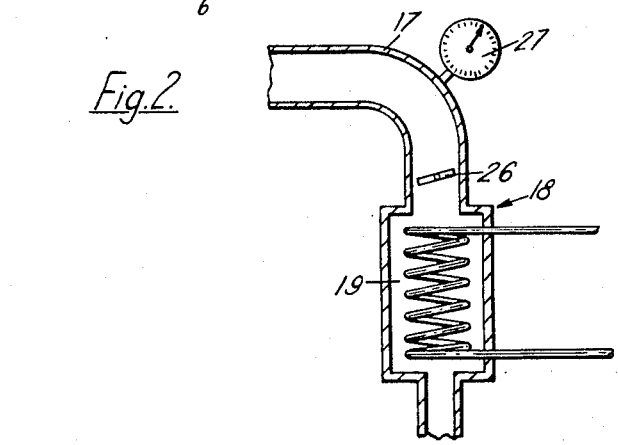
FIG. 2 is a sectional fragmentary view with exhaust vapour density regulation by means of a damper.

In lieu of controlling the outlet density of the vapour by controlling the temperature of the condenser 18, the same control can also be achieved by means of a damper located in the path of the exhaust vapour from the turbine to the condenser. Such a modification is illustrated in FIG. 2 which is a fragmentary sectional view of a unit that is basically similar to the one according to FIG. 1. As shown in FIG. 2, the thermostat unit 22, 23 of FIG. 1 is here replaced by damper 26 and a manometer 27. When the exhaust pressure has to be regulated the damper 26 is turned until the desired pressure as indicated by manometer 27 is achieved.

The power generating unit illustrated in FIG. 3 operates at a constant temperature and is designed only for a reduction of the output below the rated output by reduction of the inlet density of the vapour by throttling. Basically, the unit is of a similar design as the one according to FIG. 1 and comprises a boiler 31, an intermediary chamber 32, a neck 33, an annular manifold 34, nozzles 35, a burner 36 whose supply line 37 is controlled by a valve 38 governed by a thermostat device 39. The turbine further comprises a turbine wheel 40 keyed on a shaft 41 journalled in bearings 42, 43, supported by a casing 44. Also keyed on shaft 41 is the rotor of an electric generator 45. A duct 44 links the turbine exhaust with a condenser unit 47 whose coil 48 comprises in the water supply line 49 a valve 50 governed by a thermostat device 51 and which is fitted with a manometer 52. The thermostat 51 detects and responds to the condensing temperature. The liquid side of the condenser 47 is linked through a duct 53 and a pump 54 to boiler 31. Chamber 32 is fitted with a throttle valve 55 cooperating with a conical bore 56 provided in an inner annular flange 57. Neck 33 is fitted with a manometer 58.

The above unit functions similar as the one according to FIGS. 1 and 2. Also in this case the adjustment of the inlet and outlet densities are effected manually by adjusting the throttle valve 55 on the one hand and the thermostat device 51 on the other hand. The correct pressures are indicated by manometers 58 and 52.

Also in this case it is possible to replace the thermostat device 51 by a damper similar to the one illustrated in FIG. 2.

The embodiment of FIG. 4 is designed for an adjustment of the output in accordance with the load. Basically, this embodiment is again similar to the previous ones and comprises a boiler 61, an intermediary chamber 62, a manifold 63, nozzles 64, a burner 65 whose fuel supply is governed by a thermostat 66, a turbine wheel 67 keyed on shaft 68 together with the rotor of an electric generator 69, a condenser 70 having a coil 71 through which flows the coolant at a rate governed by a thermostat device 72 detecting and responding to the temperature on the heat transfer surface, i.e. the sink temperature. Inside chamber 62 is located a throttle valve 73.

Also keyed on shaft 68 is a speed detector 74 linked by a train of arms and levers 75, 76 and 77 to the stem of throttle valve 73. The arrangement is such that when the speed of rotation of shaft 68 increases as a result of a decrease in the load throttle valve 73 is somewhat closed causing a reduction in the inlet density of the vapour. Any such reduction causes an automatic reduction of the outlet density owing to the action of thermostat 72. This is so because by a first approximation the mean temperature difference between the condensing side and the cooling water of the condenser $\Delta T$, the amount of heat Q transferred through the heat transfer surface A and the heat transfer coefficient U are related to each other by the following equation $$\Delta T = \frac{Q}{UA}$$

Now Q is dependent on the heat rejected from the turbine and this in turn is dependent on the inlet pressure. These relationships are illustrated in the following Table IV:

TABLE IV

| | | | |
|---|---|---|---|
| Inlet pressure, mm. Hg | 91.6 | 51 | 33.6 |
| Power output, kw | 1.0 | 0.57 | 0.27 |
| Efficiency | 0.100 | 0.087 | 0.079 |
| Rejected heat, kw | 9.0 | 6.0 | 3.16 |
| Rejected heat, Kcals./hr | 7,740 | 5,160 | 2,720 |
| $\Delta T$ for $UA=400$ (° C.) | 19.3 | 12.9 | 6.8 |
| $T_c$ for $T_o=25.7°$ C (° C.) | 45.0 | 38.4 | 32.5 |
| $T_c$ from Table 1 (° C.) | 45 | 37.5 | 32.5 |
| Error (° C.) | 0 | 0.9 | 0 |

In the above table $T_c$ is the actual condensing temperature and $T_0$ is the temperature of the cooling water.

It is seen from the above table that if UA is chosen as 400 Kcals./hr. °C., ΔT across the condenser is 19.3° C. at 1 kw. load, 12.9° C. at 0.57 kw. load and 6.8° C. at 0.27 kw. load, so that if the cold water temperature $T_0$ is 25.7° C. the condensing temperatures are adjusted automatically to, respectively, 45° C., 38.4° C. and 32.5° C. As it is seen from the last two lines of Table IV, the $T_c$ values for 1 kw. and 0.27 kw. are identical with the optimum values given in Table 1 whereas for 0.57 kw. output there is a slight deviation of 0.9° C. from the optimum value indicated in Table I. It will be appreciated that this deviation is insignificant for practical purposes. It is thus seen that in accordance with this embodiment there is an automatic self-adjustment of the inlet pressure to the load and of the outlet pressure to the inlet pressure with the overall effect that the output of the unit is self-adjusted to the load while at the same time a high stage efficiency not substantially below the rated efficiency is retained.

The embodiment illustrated in FIG. 5 is basically similar to the one of FIG. 4. The identical components have thus been designated by the same numerals and will not be described again. The modification of this embodiment consists in that the thermostat 72 of FIG. 4 is replaced by a pressure balance. This pressure balance arrangement comprises a beam 80 pivoted at 81. Bearing on beam 80 from below is a first pointed diaphragm 82 linked by a pipe 83 to the outlet from chamber 62. Accordingly, the pressure $P_1$ with which diaphragm 82 acts on beam 80 is the inlet pressure. Bearing on beam 80 from above is a second pointed diaphragm 84 linked by a pipe 85 to condenser 70. Accordingly the pressure $P_0$ with which diaphragm 84 acts on beam 80 from above is the condenser pressure. Slidably mounted on beam 80 is a balancing weight 86. Beam 80 is linked to a servo-mechanism 87 governing a valve 88 which controls the flow of coolant through coil 71 of condenser 70.

It can be seen from Table III given hereinbefore that the inlet pressure $P_1$ is related to the condenser pressure $P_0$ by an equation $$P_1 = aP_0 + b$$

where $a$ and $b$ are constants. If in the present balance arrangement $L_i$ is the distance of the first diaphragm 82 from pivot 81, $A_i$ is the area of the first diaphragm 82, $L_o$ is the distance of the second diaphragm 84 and $A_o$ is the area of the second diaphragm, $L_w$ is the distance of weight 86 from pivot 81 and W is the magnitude of the weight, the constants $a$ and $b$ are given by the following equations:

$$a = \frac{A_o L_o}{A_i L_i}$$

$$b = \frac{W L_w}{A_i L_i}$$

If during operation there is a drop in $P_1$ because of the partial closure of throttle valve 73, the balance of beam 80 will be disturbed. This in turn will set servo-mechanism 87 in operation causing opening of valve 88 as a result of which the cooling rate is increased and the condenser pressure $P_0$ is reduced until the balance is reset. It is thus seen that this embodiment as well functions fully automatically.

The above embodiment operates at constant boiler temperature. If desired, the device can be modified so as to operate at varying boiler temperatures. For this purpose the mechanical output detector 74 and the throttle valve 73 can be replaced by an electric servo-mechanism coupled to a voltage detector and governing the setting of the thermostat 66.

In FIG. 6 there is illustrated a power generating unit according to the invention in which the heat supply is from a solar collector and is accordingly variable a priori. It is therefore necessary to apply the teachings of the present invention in order to ensure that for any heat supply below the design conditions for the unit the nozzle efficiency remains substantially unaltered. The unit comprises a boiler 91 heated by a solar collector 92 and linked through an intermediary chamber 93 to a manifold 94 leading to a number of nozzles 95. Keyed on a shaft 96 journalled in bearings 97, 98 and supported by casing 99 is a turbine wheel 100. Also keyed on shaft 96 is a centrifugal pump 101. From the exhaust side of turbine wheel 100 leads a duct 102 to a condenser 103 having a coil 104 whose coolant supply line is controlled by a valve 105 governed by a thermostat device 106. Thermostat 106 is linked to a first detector 107 detecting the boiler temperature and a second detector 108 detecting the temperature on the heat transfer surface, i.e. the sink temperature.

Thus, during operation any variation in the heat supply to the boiler from collector 92 will be detected by the thermostat device 106 which will either close or open valve 105, as the case may be. The second detector 108 ensures that the cooling rate in the condenser corresponds to the optimum required for achieving the highest possible nozzle efficiency in the manner described hereinbefore with reference to FIG. 4. If the primary adjustment of valve 105 is inaccurate, detector 108 provides the necessary correction. It can readily be shown that at any moment the system is in equilibrium defined by the equation:

| Heat input (from the collector to the boiler) | = | Heat losses (from boiler and manifold) | + | Heat flow through nozzle (mass flow times heat constant of unit mass) |
|---|---|---|---|---|

Instead of using thermostats for the control of the inlet and outlet densities, it is possible to use pressure-stats. The functioning of units fitted with pressure-stats devices is completely analogous to that of units with thermostat devices and need therefore not be described in detail.

The power generating unit according to the invention illustrated in FIG. 7 comprises a boiler 111 fitted with a burner 112 whose fuel supply line 113 is governed by a valve 114 controlled by a thermostat 115 linked to boiler 111. Thermostat 115 is adjustable and in this manner the output of the unit can be controlled by a control of the boiler temperature. If desired, the thermostat may be linked to a load-detector device in the manner similar to that illustrated in FIGS. 4 and 5. The unit further comprises a housing 116 inside which is mounted a turbine unit generally indicated at 117, a condenser 118 whose drain 119 is linked by means of a duct 120 fitted with a pump 121 to the boiler 111.

The turbine-generator unit 117 comprises a plurality of turbine nozzles 122, a turbine wheel 123 and a rotor 124 of an electricity generator. Turbine wheel 123 and the rotor 124 are keyed on a shaft 125 journalled in bearings 126 and 127 both connected to the housing 116. The stator 128 of the electricity generator is mounted in the housing 116.

Mounted between the turbine-generator unit 117 and condenser 118 is a regulating sonic nozzle 129 so devised that all the exhaust vapour from the turbine has to pass through the nozzle on its way to condenser 118. The design of nozzle 129 is such that the throat velocity is at a speed of at least 0.8 Mach.

Owing to the presence of nozzle 129 the pressure of the exhaust vapour emerging from the turbine-generator 117 is adjusted automatically in accordance with the density of the vapour delivered from the boiler 111 to the turbine so that irrespective of any density variations on the intake side, the turbine nozzles function in a shock-free, smooth manner and their efficiency remains substantially unaffected. Because of this it is possible to operate the unit under conditions of varying boiler temperature without affecting the turbine nozzle efficiency.

At the same time nozzle 129 also shields the turbine nozzles 122 from any adverse effect that might be caused by fluctuations in the temperature of condenser 118. Consequently in case of any such fluctuations the turbine nozzles again continue to function in a smooth, shock-free manner which would not be the case if the regulating nozzle 129 were not present. In such a case some alternative much more complicated means would have been necessary, for example means for the automatic adjustment of the boiler temperature to correct for changes in the condenser temperature, or vice versa.

The same unit is also applicable for operating on solar radiation. In this case the assembly of heater 112, pipe 113, valve 114 and thermostat 115 will be replaced by a device for collecting solar radiation and converting it into heat, in combination with a suitable heat exchanger for transferring the heat to the boiler. In this case the power output of the unit will depend on the available heat, the purpose of the regulating nozzle being to keep the efficiency optimum for varying heating conditions.

The power generating unit illustrated in FIG. 8 is of analogous design as the unit of FIG. 7 so that the same components have been designated by the same numerals. As shown, this unit comprises mounted between boiler 111 and the turbine nozzles 122 a second regulating sonic nozzle 130 having a throat velocity of at least 0.8 Mach and so designed that all of the vapour generated by the boiler has to pass on its way from the boiler to the turbine nozzles 122 through the nozzle. By the provision of this second regulating sonic nozzle 130, the boiler 1 is shielded from any varying conditions in the unit so that the mass flow from the boiler as determined by the temperature remains unaffected. Consequently the output of the power generating unit corresponds to the value rated for a given boiler temperature and can be changed by changing this temperature.

I claim:

1. In a power generating unit operating on a closed Rankine cycle and adapted to drive a load, said unit comprising a motive fluid circulating in the unit, a boiler evaporating the fluid to a vapor, a turbine including a turbine shaft and having at least one primary nozzle to which the vapor from the boiler is fed, a condenser condensing the vapor from the turbine to a liquid and means recycling the condensed liquid to the boiler: that improvement comprising means at the exhaust side of the turbine for adjusting the density of the turbine exhaust vapor in accordance with the inlet density so that when the inlet density increases the exhaust density increases, when the inlet density decreases the exhaust density decreases and when the inlet density remains constant the exhaust density remains constant, thereby to prevent a substantial drop of the nozzle efficiency.

2. The improvement in a power generating unit according to claim 1 wherein the means regulating the density of the turbine exhaust vapor constitutes means damping the exhaust vapor flow between the turbine and the condenser.

3. The improvement in a power generating unit according to claim 1 wherein the means adjusting the density of the turbine exhaust vapor in dependence on the inlet density constitutes at least one first auxiliary nozzle, said auxiliary nozzle being so positioned between the turbine and the condenser that all the exhaust vapor leaving the turbine passes through said auxiliary nozzle to the condenser, the auxiliary nozzle being so dimensioned that all the vapor flows through the throat thereof at a velocity of at least 0.8 Mach at normal operating boiler pressure.

4. The improvement in a power generating unit according to claim 1 also comprising means for varying the inlet density of the vapor fed from the boiler to the turbine.

5. The improvement in a power generating unit according to claim 4 wherein the means varying the inlet density constitutes means controlling the boiler temperature.

6. The improvement in a power generating unit according to claim 5 wherein the means controlling the boiler temperature is responsive to the condenser temperature, the power generating unit thereby providing a constant power output under widely varying condenser temperatures.

7. The improvement in a power generating unit according to claim 4 wherein the means for varying the inlet density constitutes means throttling the vapor flow from the boiler to the primary nozzle.

8. The improvement in a power generating unit according to claim 4 having a load detector, wherein the means varying the inlet density is responsive to the load detector.

9. The improvement in a power generating unit according to claim 8 wherein the load detector constitutes mechanical means responsive to the speed of rotation of the turbine shaft.

10. The improvement in a power generating unit according to claim 8 further including a generator having an output voltage and driven by the turbine and wherein the load detector constitutes means responsive to the output voltage of the generator.

11. The improvement in a power generating unit according to claim 4 wherein a variable heat supply is provided to operate the boiler.

12. The improvement in a power generating unit according to claim 11 wherein the heat supply constitutes a solar radiation collector.

13. The improvement in a power generating unit according to claim 4 wherein variation of boiler temperature effects a variation of inlet density, the unit further having at least one second auxiliary nozzle in the vapor path from the boiler to the turbine, the auxiliary nozzle being so positioned that all the vapor from the boiler to the turbine passes through the auxiliary nozzle and being so dimensioned that the vapor flows through said auxiliary nozzle at a throat velocity of at least 0.8 Mach at normal operating boiler pressure.

14. The improvement in a power generating unit according to claim 1 wherein the means regulating the density of the turbine exhaust vapor constitutes means controlling the condenser temperature.

15. The improvement in a power generating unit according to claim 14 having coolant flowing through the condenser, wherein the means controlling the condenser temperature constitutes an adjustable thermostatically-regulated valve, said thermostatically-regulated valve being responsive to the condenser temperature and governing the flow of coolant.

16. The improvement in a power generating unit according to claim 14 having coolant flowing through the condenser, wherein the means controlling the condenser temperature constitutes an adjustable pressure-sensitive regulating valve, said pressure-sensitive regulating valve being responsive to the condenser pressure and governing the flow of coolant.

17. The improvement in a power generating unit according to claim 14 wherein the condenser has a heat transfer surface and coolant flows through the condenser, the means controlling the condenser temperature constituting an adjustable thermostatically-regulated valve responsive to the temperature of the heat transfer surface of the condenser and governing the flow of coolant to the condenser.

18. The improvement in a power generating unit according to claim 14 wherein the means controlling the condenser temperature comprises a balance-operated valve, said balance-operated valve being acted upon on one side by the turbine inlet pressure and on the other side by the turbine outlet pressure, said balance-operated valve governing the flow of coolant through the condenser so that a change of said flow is engendered whenever the balance is altered.

References Cited

UNITED STATES PATENTS

| | | | |
|---|---|---|---|
| 2,861,194 | 11/1958 | Bristol | 290—2 |
| 2,982,864 | 5/1961 | Furreboe | 290—2 |
| 3,135,096 | 6/1964 | Schroedter. | |
| 3,175,367 | 3/1965 | Gorzegno et al. | |
| 3,233,413 | 2/1966 | Wagner et al. | 60—105 |
| 3,244,898 | 4/1966 | Hickox | 290—2 |

ORIS L. RADER, *Primary Examiner.*

D. G. SIMMONS, *Assistant Examiner.*